US011434911B2

(12) United States Patent
Otsuki et al.

(10) Patent No.: US 11,434,911 B2
(45) Date of Patent: Sep. 6, 2022

(54) PUMP DEVICE

(71) Applicant: NIDEC SANKYO CORPORATION, Nagano (JP)

(72) Inventors: Noboru Otsuki, Nagano (JP); Hiroki Kuratani, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 524 days.

(21) Appl. No.: 16/271,895

(22) Filed: Feb. 11, 2019

(65) Prior Publication Data

US 2019/0249673 A1    Aug. 15, 2019

(30) Foreign Application Priority Data

Feb. 14, 2018  (JP) .............................. JP2018-023706
Nov. 27, 2018  (JP) .............................. JP2018-221515

(51) Int. Cl.

| F04D 13/06 | (2006.01) |
| F04D 29/60 | (2006.01) |
| H02K 3/34  | (2006.01) |

(52) U.S. Cl.
CPC ........... *F04D 13/06* (2013.01); *F04D 29/605* (2013.01); *H02K 3/34* (2013.01); *F04D 13/0673* (2013.01)

(58) Field of Classification Search
CPC .. F04D 13/06; F04D 13/0606; F04D 13/0633; F04D 29/041; F04D 13/0673; H02K 1/04; H02K 1/06; H02K 3/34; H02K 3/345; H02K 44/02; H02K 44/04; H02K 44/06; H02K 3/32; H02K 3/325
See application file for complete search history.

(56) References Cited

U.S. PATENT DOCUMENTS

| 2001/0017501 A1* | 8/2001 | Suzuki ................... H02K 3/522 |
| | | 310/261.1 |
| 2013/0028765 A1* | 1/2013 | Yokozawa ............. H02K 11/33 |
| | | 417/423.11 |
| 2015/0008769 A1* | 1/2015 | Uchitani ................ H02K 15/08 |
| | | 310/43 |

FOREIGN PATENT DOCUMENTS

| CN | 206346922 | 7/2017 |
| CN | 107026518 | 8/2017 |
| CN | 107425627 | 12/2017 |
| CN | 107492968 | 12/2017 |
| CN | 209638020 | 11/2019 |
| EP | 1936778   | 6/2008 |
| JP | 2003189522| 7/2003 |

(Continued)

OTHER PUBLICATIONS

"Office Action of China Counterpart Application", dated May 26, 2020, with English translation thereof, p. 1-p. 11.

*Primary Examiner* — Philip E Stimpert
(74) *Attorney, Agent, or Firm* — JCIPRNET

(57) ABSTRACT

A pump device is provided. In the pump device, in a first wall portion of an insulator configured to surround an inner partition wall portion arranged on an inner peripheral side of a stator core and to prevent a winding of a driving coil from collapsing, there is provided a first notch cut out from an end surface on a Z2 direction side of the first wall portion toward a Z1 direction side. And, in a second wall portion of an insulator configured to surround an inner partition wall portion and to prevent a winding of a driving coil from collapsing, there is provided a second notch cut out from an end surface on a Z1 direction side of the second wall portion toward a Z2 direction side.

13 Claims, 8 Drawing Sheets

(56) References Cited

FOREIGN PATENT DOCUMENTS

| | | |
|---|---|---|
| JP | 2014124007 | 7/2014 |
| JP | 2016158484 | 9/2016 |
| JP | 2017229210 | 12/2017 |

* cited by examiner

PUMP DEVICE

CROSS REFERENCE TO RELATED APPLICATION

The present application claims priority under 35 U.S.C. § 119 to Japanese Application No. 2018-023706 filed Feb. 14, 2018, and Japanese Application No. 2018-221515 filed Nov. 27, 2018, and the entire content of which is incorporated herein by reference.

BACKGROUND

Technical Field

The present disclosure relates to a pump device including a motor and an impeller configured to rotate by a power of the motor.

Description of the Related Documents

Conventionally, there is known a pump device including a motor and an impeller configured to be rotated by the power of the motor (for example, see Japanese Unexamined Patent Application Publication No. 2017-229210 (hereinafter, referred to as Patent Document 1)). In the pump device described in Patent Document 1, the motor includes a rotor, a stator, and a circuit board configured to control the motor. The impeller, the rotor, the stator, and the circuit board are arranged inside a case body including a housing constituting a part of the motor, and a case covering a lower part of the housing. The housing includes: a partition member having a partition wall arranged between the rotor and impeller and the stator so as to partition the rotor and impeller from the stator; and a cover fixed to an upper end side of the partition member.

In the pump device described in Patent Document 1, the stator includes a driving coil, a stator core, and an insulator. The stator core includes an outer peripheral annular portion formed in a ring shape, and three salient poles protruding inward in a radial direction (in the radial direction of the rotor) from the outer peripheral annular portion. The driving coil is wound around the salient poles via the insulator. The insulator is attached to each salient pole, and the stator includes three insulators.

Further, in the pump device described in Patent Document 1, the insulator is formed in a brimmed tubular shape a brim having a brim at each end, and includes an inner brim constituting an inner portion of the insulator in the radial direction, an outer brim constituting an outer portion of the insulator in the radial direction, and a tubular portion configured to connect the inner brim and the outer brim. The inner brim functions to prevent the winding of the driving coil from collapsing in an inner side in the radial direction, and the outer brim functions to prevent the winding of the driving coil from collapsing in an outer side in the radial direction.

Further, in the pump device described in Patent Document 1, the partition wall includes a cylindrical portion formed in a cylindrical shape, and a disk-shaped bottom configured to close an upper end of the cylindrical portion. A driving magnet is arranged on an inner peripheral side of the cylindrical portion. A distal end surface of the salient pole of the stator core faces an outer peripheral surface of the cylindrical portion. The outer peripheral surface of the cylindrical portion is surrounded by the inner brim of the three insulators. The partition wall member includes a tubular outer tube arranged on an outer peripheral side of the partition wall, and a bottom surface configured to connect the lower end of the cylindrical portion and the lower end of the outer tube. The cover is fixed to an upper end side of the inner peripheral surface of the outer tube, and is configured to close an opening at an upper end of the outer tube. The stator and the circuit board are arranged in a space defined by the cylindrical portion, the outer tube, the bottom surface, and the cover. It is noted that Patent Document 1 states that a resin sealing member may be filled inside the space defined by the cylindrical portion, the outer tube, the bottom surface, and the cover (that is, the space in which the stator and the circuit board are arranged).

SUMMARY

The inventors of the present application discuss a pump device such as the pump device described in Patent Document 1, in which the stator core is attached with an insulator including two divided insulators integrated in a circumferential direction of the rotor while divided into two parts in an axial direction of the rotor, in order to facilitate handling of the insulator at the time of assembling the pump device. In this case, the inner brim configured to prevent the winding of the driving coil from collapsing in an inner side in the radial direction of the rotor is formed in a ring shape surrounding the cylindrical portion of the partition wall.

Further, the inventors of the present disclosure discuss a pump device such as the pump device described in Patent Document 1, in which a potting resin is filled in a space in which the stator is arranged, with an aim of enhancing a waterproofness, heat dissipation, and noise reduction. However, the discussion by the inventors of the present disclosure found that in the pump device described in Patent Document 1, for example, if the insulator including two divided insulators integrated in the circumferential direction of the rotor is attached to the stator core, it becomes difficult for the potting resin to be poured on an inner peripheral side of the ring-shaped inner brim surrounding the cylindrical portion, and thus, it is difficult to fill the potting resin on the inner peripheral side of the inner brim.

Thus, the present disclosure provides a pump device including: a motor with a rotor and a stator; and an impeller configured to rotate by a power of the motor, such that even if an insulator is integrated in the circumferential direction of the rotor in the pump device in which a potting resin is filled in a region where the stator is arranged, the potting resin can be easily filled up to an inner peripheral side of a portion of the insulator configured to prevent a winding of a driving coil from collapsing on an inner side in the radial direction of the rotor.

In order to solve the problem described above, the pump device according to the present disclosure includes: a motor, having a rotor and a stator; and an impeller, fixed to the rotor and configured to be rotated by a power of the motor. In such a pump device, a pump chamber through which a liquid sucked from a suction port passes toward a discharge port is provided inside a pump case, and the rotor, the stator, and the impeller are housed in the pump case. The rotor and the impeller are arranged inside the pump chamber. The stator is arranged outside the pump chamber. The motor includes a partition wall defining a part of the pump chamber, and the partition wall is arranged between the rotor and the impeller, and the stator, so as to partition the rotor and the impeller from the stator. A potting resin is filled in a region that is inside of the pump case and outside of the pump chamber, and in which the stator is arranged. One of axial directions of a rotation center axis serving as a rotation center of the rotor and the impeller is set as a first direction, and an opposite direction of the first direction is set as a second direction. The stator includes: a driving coil; an insulator formed of an insulating material; and a stator core having a plurality of salient poles around which the driving coil is wound via the insulator. The partition wall includes: an inner partition wall portion with a tubular shape arranged on an inner peripheral side of the stator core. The insulator includes: a first wall portion with an annular shape, rising toward a side of the first direction (i.e., a first direction side) and surrounding the inner partition wall portion, the first wall portion being configured to prevent a winding of the driving coil from collapsing inward in a radial direction of the rotor; and a second wall portion with the annular shape, rising toward a side of the second direction (i.e., a second direction side) and surrounding the inner partition wall portion, the second wall portion being configured to prevent the winding of the driving coil from collapsing inward in the radial direction of the rotor. In the first wall portion, there is provided a first notch cut out from an end surface on the side of the first direction of the first wall portion toward the side of the second direction, and in the second wall portion, there is provided a second notch cut out from an end surface on the side of the second direction of the second wall portion toward the side of the first direction.

In the pump device according to the present disclosure, a first notch cut out from an end surface on the side of the first direction of the first wall portion toward the side of the second direction is provided in the first wall portion of the insulator rising toward the side of the first direction and surrounding the inner partition wall portion and configured to prevent a winding collapse of the driving coil toward an inner side in a radial direction of the rotor. Therefore, in the present disclosure, even if the insulator is integrated in the circumferential direction of the rotor and the first wall portion is provided in a ring shape, it is possible to pour the potting resin to the inner peripheral side of the first wall portion by using the first notch. Accordingly, in the present disclosure, even if the insulator is integrated in the circumferential direction of the rotor, it is possible to easily fill the potting resin to the inner peripheral side of the first wall portion configured to prevent a winding of the driving coil from collapsing in the inner side in the radial direction of the rotor.

In the pump device according to the present disclosure, since a second notch cut out from an end surface on the side of the second direction of the second wall portion toward the side of the first direction is provided in the second wall portion of the insulator rising toward the side of the second direction and surrounding the inner partition wall portion and configured to prevent a winding of the driving coil from collapsing inward in a radial direction of the rotor, even if the insulator is integrated in the circumferential direction of the rotor and the second wall portion is provided in a ring shape, it is possible to pour the potting resin to the inner peripheral side of the second wall portion by using the second notch. Accordingly, in the present disclosure, even if the insulator is integrated in the circumferential direction of the rotor, it is possible to easily fill the potting resin to the inner peripheral side of the second wall portion configured to prevent winding of the driving coil from collapsing in the inner side in the radial direction of the rotor.

In the present disclosure, for example, the stator core includes: an annular core portion provided in a ring shape; and the plurality of salient poles protruding from the annular core portion toward an outer side in the radial direction of the rotor. The insulator includes: an insulator base with the annular shape, constituting an inner portion of the insulator in the radial direction of the rotor, the insulator base being configured to cover at least a part of an outer peripheral surface of the annular core portion, at least a part of an end surface on the side of the first direction of the annular core portion, and at least a part of an end surface on the side of the second direction of the annular core portion. The first wall portion is rising toward the side of the first direction from a surface on the side of the first direction of the insulator base; and the second wall portion is rising toward the side of the second direction from a surface on the side of the second direction of the insulator base.

In the present disclosure, for example, the insulator includes: a first insulator and a second insulator divided in an axial direction of the rotation center axis. The first insulator includes: a first insulator base, constituting a first direction side portion of the insulator base; and the first wall portion, rising toward the side of the first direction from a surface on the side of the first direction of the first insulator base. And, the second insulator includes: a second insulator base, constituting a second direction side portion of the insulator base; and the second wall portion, rising toward the side of the second direction from a surface on the side of the second direction of the second insulator base.

In the present disclosure, for example, the rotor includes: a driving magnet, arranged on an outer peripheral side of the stator. The partition wall includes: an inner partition wall portion; an outer partition wall portion with the tubular shape, arranged on an outer peripheral side of the stator and an inner peripheral side of the driving magnet; and an annular partition wall portion with a ring shape, extending from a first direction end of the inner partition wall portion toward an outer side in the radial direction of the rotor, the annular partition wall portion being configured to connect the first direction end of the inner partition wall portion and the first direction end of the outer partition wall portion, the stator is arranged on the side of the second direction of the annular partition wall portion and between the inner partition wall portion and the outer partition wall portion, and the potting resin is filled on at least the side of the second direction of the annular partition wall portion and between the inner partition wall portion and the outer partition wall portion.

In the present disclosure, it is preferable that the first notch is provided between the driving coils in a circumferential direction of the rotor. With such a configuration, the flow of the potting resin that is poured up to the inner peripheral side of the first wall portion through the first notch does not tend to be hindered by the driving coil. Therefore, the potting resin can be easily poured in the inner peripheral side of the first wall portion.

In the present disclosure, it is preferable that the partition wall includes: an annular partition wall portion with a ring shape, extending from a first direction end of the inner partition wall portion toward an outer side in the radial direction of the rotor. On a surface on the side of the second direction of the annular partition wall portion, there are provided a plurality of reinforcing ribs with a flat plate shape, configured to be connected to an outer peripheral surface of the inner partition wall portion and also to be connected to a surface on the side of the second direction of the annular partition wall portion, the reinforcing ribs are provided between the driving coils in the circumferential direction of the rotor, and a part of the reinforcing ribs is arranged in the first notch.

With such a configuration, it is possible to secure the strength of the partition wall by the reinforcing rib, and also to prevent a contact between driving coils adjacent to each other in the circumferential direction of the rotor. In addition, with such a configuration, since a part of the reinforcing ribs is arranged in the first notch, when the potting resin is poured in the region in which the stator is arranged, the potting resin that is contact with a side surface of the reinforcing ribs can be made to flow along the side surface of the reinforcing rib and pass through the first notch. That is, it is possible to pour the potting resin to the inner peripheral side of the first wall portion by using the side surface of the reinforcing ribs. Therefore, the potting resin can be more easily poured in the inner peripheral side of the first wall portion.

In the present disclosure, it is preferable that the pump device includes a circuit board configured to control the motor. In such a pump device, preferably, the impeller is fixed on the side of the first direction of the rotor, the circuit board is a rigid board in a flat plate shape, is arranged on the side of the second direction of the stator, and is covered with the potting resin. A thickness direction of the circuit board coincides with an axial direction of the rotation center axis. And, a third notch in which a part on a second direction end side of the driving coil is arranged is provided in the circuit board. With this configuration, even if a circuit board that is a flat plate-shaped rigid board is arranged on the side of the second direction of the stator, the potting resin can be easily poured in the region in which the stator is arranged by using the third notch.

In the present disclosure, for example, the second notch is provided at a position where the driving coil is arranged in a circumferential direction of the rotor, and in the circuit board, there are provided a plurality of opposing surfaces arranged between the driving coils in the circumferential direction of the rotor and opposing to an outer peripheral surface of the second wall portion. In this case, for example, if the plurality of opposing surfaces provided on the circuit board are in contact with the outer peripheral surface of the second wall portion, then even if it is possible to pour the potting resin to the inner peripheral side of the second wall portion by using the second notch provided in the second wall portion, the circuit board can be positioned in the radial direction of the rotor by using the second wall portion.

In the present disclosure, the second notch may be provided between the driving coils in the circumferential direction of the rotor, and an end surface on the side of the first direction of the second notch may be arranged on the side of the first direction from a surface on the side of the first direction of the circuit board. In this case, since the flow of the potting resin that is poured up to the inner peripheral side of the second wall portion through the second notch does not tend to be hindered by the driving coil and the circuit board, it is possible to easily pour the potting resin in the inner peripheral side of the second wall portion.

As described above, according to the present disclosure, in a pump device including: a motor having a rotor and a stator; and an impeller configured to rotate by a power of the motor, in which a potting resin is filled in a region in which the stator is arranged, the potting resin can be easily filled up to an inner peripheral side of a portion of an insulator configured to prevent a winding of a driving coil from collapsing in an inner side in the radial direction of the rotor even if the insulator is integrated in the circumferential direction of the rotor.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Next, an embodiment of the present disclosure will be described with reference to the drawings.

(Overall Configuration of Pump Device)

Figure 1:
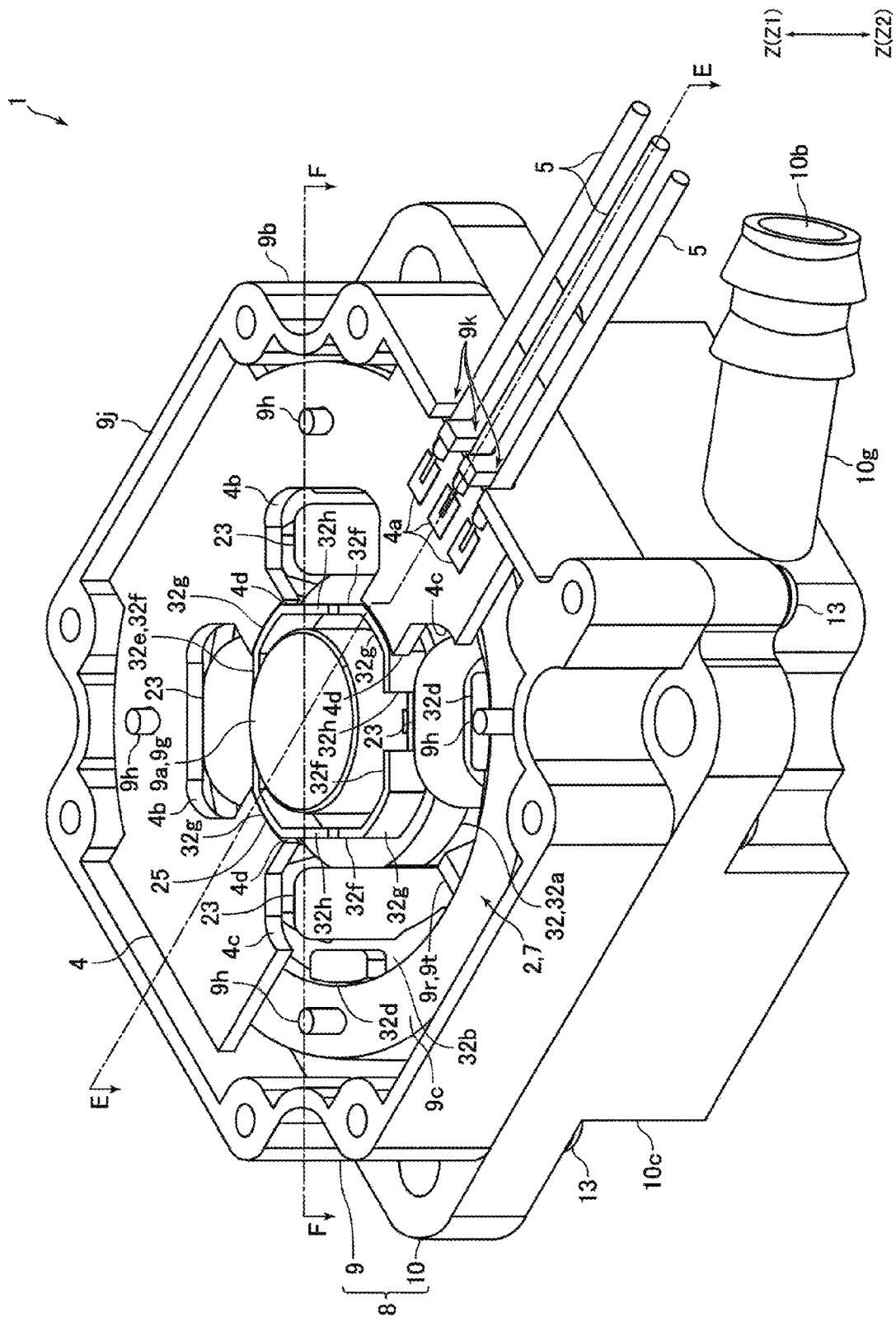
FIG. 1 is a perspective view of a state in which a cover is removed from a pump device according to an embodiment of the present disclosure.
Figure 2:
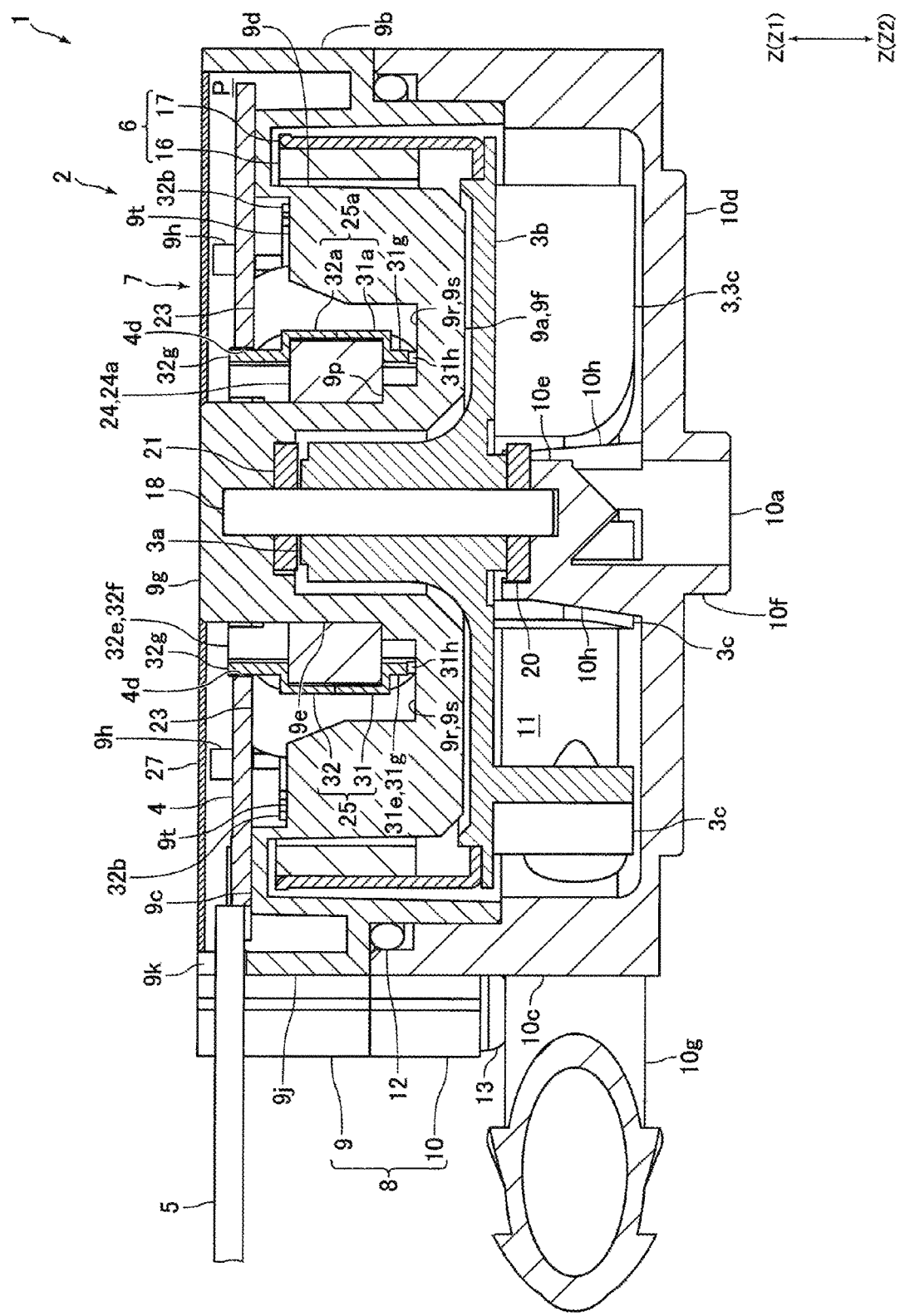
FIG. 2 is a cross-sectional view of a cross section corresponding to an E-E cross section in FIG. 1.
Figure 3:
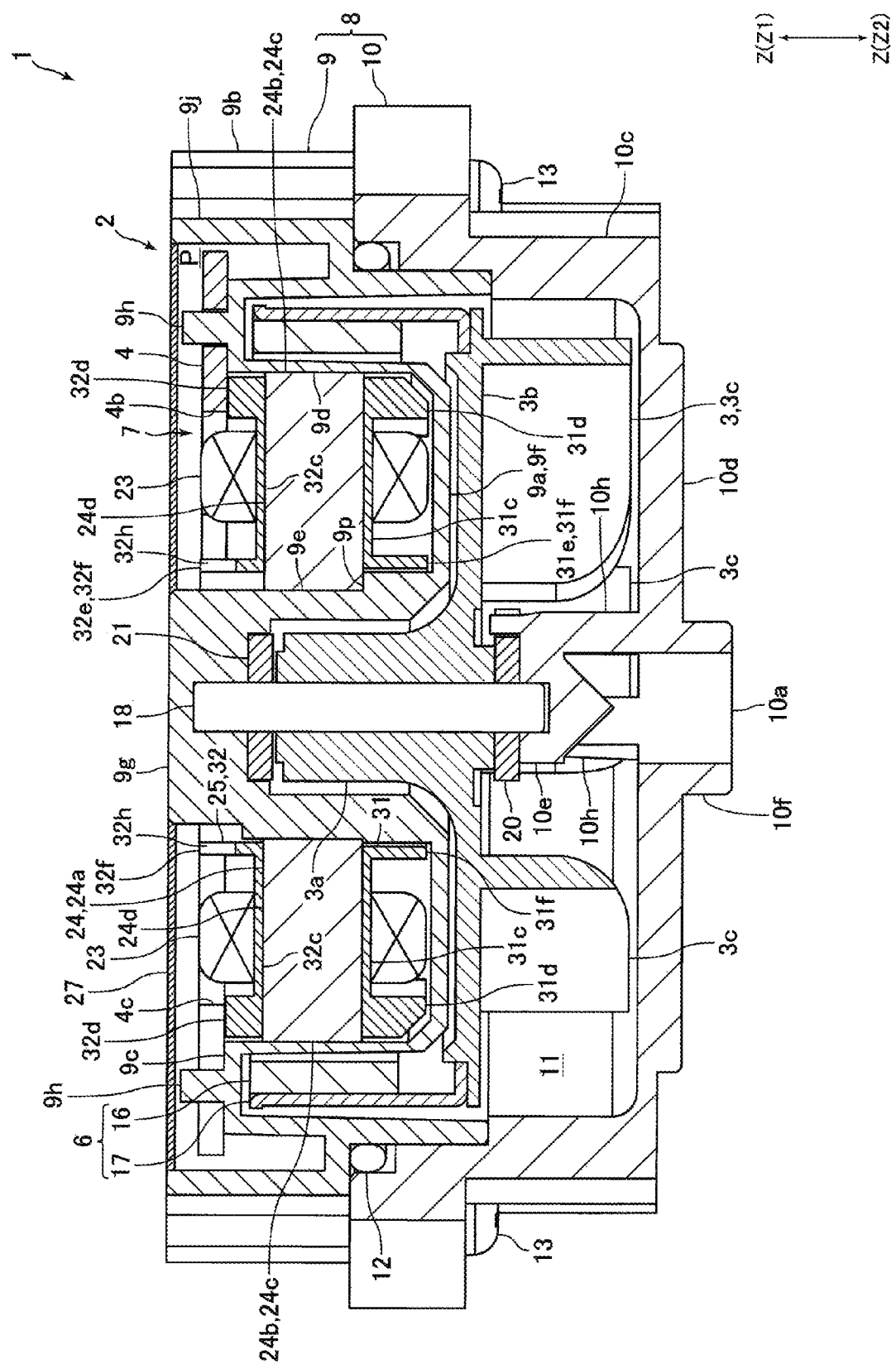
FIG. 3 is a cross-sectional view of a cross section corresponding to an F-F cross section in FIG. 1.
Figure 4:
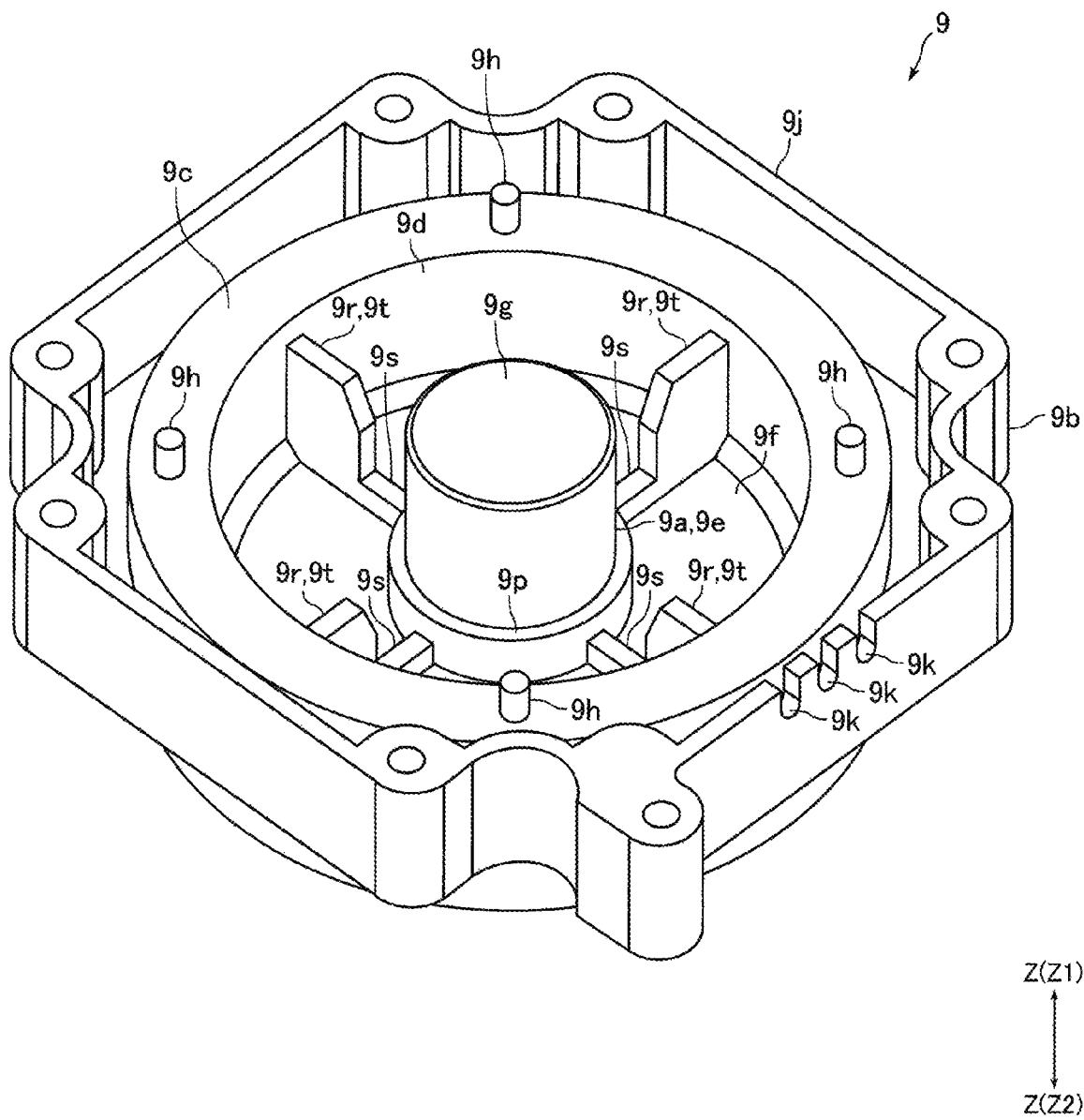
FIG. 4 is a perspective view of a motor case illustrated in FIG. 1.

FIG. 1 is a perspective view of a state in which a cover 27 is removed from a pump device 1 according to an embodiment of the present disclosure. FIG. 2 is a cross-sectional view of a cross section corresponding to an E-E cross section in FIG. 1. FIG. 3 is a cross-sectional view of a cross section corresponding to an F-F cross section in FIG. 1. FIG. 4 is a perspective view of a motor case 9 illustrated in FIG. 1. In the following description, a Z direction in FIG. 1 is defined as the "vertical direction". In addition, the Z1 direction side in FIG. 1, which is one side in the vertical direction, is defined as the "upper" side, and the Z2 direction side, which is the other side, is defined as the "lower" side.

The pump device 1 of the present embodiment is a centrifugal pump of a type called a canned pump (canned motor pump). The pump device 1 includes a motor 2, an impeller 3 configured to rotate by a power of the motor 2, a circuit board 4 configured to control the motor 2, and a lead wire 5 drawn from the circuit board 4. The pump device 1 of the present embodiment has three lead wires 5. The motor 2 is a DC brushless motor. The motor 2 includes a rotor 6 and a stator 7. The impeller 3, the rotor 6, and the stator 7 are housed in a pump case 8. The pump case 8 includes a motor case 9 constituting a part of the motor 2 and a case body 10 fixed on the lower end side of the motor case 9.

In the case body 10, a suction port 10a for liquid such as water and a discharge port 10b for the liquid are formed. Inside the pump case 8, a pump chamber 11 through which liquid sucked from the suction port 10a passes toward the discharge port 10b is formed. The pump chamber 11 is defined by the motor case 9 and the case body 10. At a joint portion between the motor case 9 and the case body 10, an annular seal member 12 for ensuring sealing of the pump chamber 11 is arranged. The seal member 12 is an O-ring. The motor case 9 and the case body 10 are fixed to each other by a plurality of screws 13.

The rotor 6 includes a driving magnet 16 formed in a cylindrical shape and a cylindrical magnet holding member 17 to which the driving magnet 16 is fixed. The magnet holding member 17 formed in a cylindrical shape is arranged so that the axial direction of the magnet holding member 17 and the vertical direction coincide with each other. The driving magnet 16 is fixed to the inner peripheral surface of the magnet holding member 17. On the inner peripheral surface of the driving magnet 16, N poles and S poles are alternately magnetized in the circumferential direction. The magnet holding member 17 is formed of a soft magnet. On the lower end side of the magnet holding member 17, the impeller 3 is fixed. In other words, the impeller 3 is fixed on the lower end side of the rotor 6.

The impeller 3 and the rotor 6 are arranged inside the pump chamber 11. Further, the impeller 3 and the rotor 6 are rotatably supported by a fixed shaft 18. The impeller 3 and the rotor 6 rotate around the fixed shaft 18 serving as a rotation center. The fixed shaft 18 of the present embodiment is a central rotating shaft which is the rotation center of the impeller 3 and the rotor 6. The fixed shaft 18 is arranged so that the axial direction of the fixed shaft 18 and the vertical direction coincide with each other. That is, the vertical direction (Z direction) is the axial direction of the fixed shaft 18. Further, the downward direction (Z2 direction) in the present embodiment is a first direction toward one side in the axial direction of the fixed shaft 18, and the upward direction (Z1 direction) is a second direction opposite to the first direction.

The impeller 3 is made of resin. The impeller 3 includes a bearing portion 3a through which the fixed shaft 18 is inserted, a disk-shaped blade forming unit 3b fixed to the lower end of the magnet holding member 17 and configured to close the lower end of the magnet holding member 17, and a plurality of blades 3c protruding downward from the lower surface of the blade forming unit 3b. The bearing portion 3a is formed in a cylindrical shape, and the fixed shaft 18 is inserted on the inner peripheral side of the bearing portion 3a. Further, the bearing portion 3a is connected to the center of the blade forming unit 3b. To the lower end of the magnet holding member 17, an outer peripheral side portion of the blade forming unit 3b is fixed.

A lower end of the fixed shaft 18 is held by the case body 10, and an upper end of the fixed shaft 18 is held by the motor case 9. Between the case body 10 and the bearing portion 3a, a thrust bearing 20 is arranged, and between the motor case 9 and the bearing portion 3a, a thrust bearing 21 is arranged. The thrust bearings 20 and 21 are slide bearings each formed in a flat plate shape. Either between the thrust bearing 20 and the bearing portion 3a or between the thrust bearing 21 and the bearing portion 3a, or both thereof, a gap (thrust play) is formed.

The stator 7 is arranged on the inner peripheral side of the driving magnet 16. That is, the motor 2 of the present embodiment is an outer rotor type motor in which the driving magnet 16 constituting a part of the rotor 6 is arranged on the outer peripheral side of the stator 7. Further, the stator 7 is arranged on the outer peripheral side of the fixed shaft 18 and the bearing portion 3a. The stator 7 is also arranged outside the pump chamber 11. The stator 7 includes a plurality of driving coils 23, a stator core 24, and an insulator 25 made of an insulating material such as resin. A specific configuration of the stator 7 will be described later.

The circuit board 4 is a rigid board such as a glass epoxy board and is formed in a flat plate shape. The circuit board 4 is arranged so that the thickness direction of the circuit board 4 and the vertical direction coincide with each other. That is, the thickness direction of the circuit board 4 coincides with the axial direction of the fixed shaft 18. Further, the circuit board 4 is arranged on the upper end side of the stator 7. On the upper surface of the circuit board 4, a solder land 4a (see FIG. 1) to which a core wire of the lead wire 5 is fixed by soldering is formed. The circuit board 4 and the stator 7 are housed in the motor case 9. A specific configuration of the circuit board 4 will be described later.

As described above, the motor case 9 constitutes a part of the motor 2. That is, the motor 2 includes the motor case 9. The motor case 9 is made of resin. The motor case 9 includes a partition wall 9a placed between the stator 7 and a set of the impeller 3 and the rotor 6 and configured to partition the set of the impeller 3 and the rotor 6 from the stator 7. The partition wall 9a defines a part of the pump chamber 11 and serves the function of preventing the inflow of the liquid in the pump chamber 11 into the place where the stator 7 and the circuit board 4 are arranged.

The partition wall 9a includes a tubular outer partition wall portion 9d arranged on the outer peripheral side of the stator 7 and on the inner peripheral side of the driving magnet 16, and a tubular inner partition wall portion 9e arranged on the inner peripheral side of the stator 7. The outer partition wall portion 9d and the inner partition wall portion 9e are formed in a cylindrical shape and are concentrically arranged around the fixed shaft 18. Further, the partition wall 9a includes a ring-shaped annular partition wall portion 9f configured to connect the lower end of the outer partition wall portion 9d and the lower end of the inner partition wall portion 9e, and a bottom 9g configured to close the upper end of the inner partition wall portion 9e.

On the outer peripheral surface of the inner partition wall portion 9e, there is formed a stepped surface 9p configured to position the stator core 24 in the vertical direction. The stepped surface 9p is a plane orthogonal to the vertical direction, and is formed in an annular shape. The outer diameter of a portion of the inner partition wall portion 9e above the stepped surface 9p is smaller than the outer diameter of a portion of the inner partition wall portion 9e below the stepped surface 9p. The bottom 9g is a shaft holding unit configured to hold the upper end of the fixed shaft 18. The bottom 9g holds the thrust bearing 21 while holding the upper end of the fixed shaft 18. The annular partition wall portion 9f extends outward in the radial direction of the rotor 6 from the lower end of the inner partition wall portion 9e. The annular partition wall portion 9f is formed in an annular shape while being formed in a flat plate shape orthogonal to the vertical direction.

As illustrated in FIG. 4, on an upper surface of the annular partition wall portion 9f, there are formed a plurality of flat plate-like reinforcing ribs 9r configured to be connected to the outer peripheral surface of the inner partition wall portion 9e, and also to be connected to an upper surface of the annular partition wall portion 9f. In the present embodiment, four reinforcing ribs 9r are formed at a pitch of 90° around the fixed shaft 18. The four reinforcing ribs 9r are arranged radially around the fixed shaft 18. The reinforcing ribs 9r include a first rib 9s constituting the inner portion of the reinforcing ribs 9r in the radial direction of the rotor 6, and a second rib 9t constituting the outer portion of the reinforcing ribs 9r in the radial direction of the rotor 6.

The height of the first rib 9s is significantly lower than the height of the second rib 9t. The inner end of the first rib 9s in the radial direction of the rotor 6 is connected to the outer peripheral surface of the inner partition wall portion 9e. Specifically, the inner end of the first rib 9s in the radial direction of the rotor 6 is connected to a portion of the outer peripheral surface of the inner partition wall portion 9e below the stepped surface 9p. The outer end of the first rib 9s in the radial direction of the rotor 6 is connected to the inner end of the second rib 9t in the radial direction of the rotor 6. The outer end of the second rib 9t in the radial direction of the rotor 6 is connected to the inner peripheral surface of the outer partition wall portion 9d.

Further, the motor case 9 includes a tubular outer peripheral tube 9b arranged on the outer peripheral side of the partition wall 9a, and a connecting unit 9c configured to connect the partition wall 9a and the outer peripheral tube 9b. The case body 10 is fixed to the lower end side of the outer peripheral tube 9b. The outer peripheral tube 9b and the outer partition wall portion 9d are arranged concentrically around the fixed shaft 18. The connecting unit 9c is formed in an annular shape, and is also formed in a flat plate shape orthogonal to the vertical direction. The connecting unit 9c extends outward in the radial direction of the rotor 6 from the upper end of the outer partition wall portion 9d, and connects the upper end of the outer peripheral tube 9b and the upper end of the outer partition wall portion 9d. The upper surface of the connecting unit 9c is arranged below the upper end surface of the outer peripheral tube 9b. A plurality of protrusions 9h configured to position and fix the circuit board 4 are formed on the upper surface of the connecting unit 9c. The protrusions 9h protrude upward from the upper surface of the connecting unit 9c.

As described above, the circuit board 4 and the stator 7 are housed in the motor case 9. The stator 7 is arranged above the annular partition wall portion 9f and between the outer partition wall portion 9d and the inner partition wall portion 9e. The circuit board 4 is housed in the motor case 9 while being in contact with the upper surface of the connecting unit 9c. A portion of the outer tube 9b is a wall portion 9j surrounding the circuit board 4. The wall portion 9j is formed in a substantially rectangular tubular shape. The upper end surface of the wall portion 9j is the upper end surface of the outer peripheral tube 9b. Further, the upper end surface of the wall portion 9j is the upper end surface of the motor case 9.

An opening formed at the upper end of the wall portion 9j is closed by the cover 27. The cover 27 is formed in a thin flat plate shape and is arranged so that the thickness direction of the cover 27 coincides with the vertical direction. The cover 27 is arranged above the circuit board 4. The end surface (outer peripheral surface) of the cover 27 is in contact with the inner side surface of the wall portion 9j. At the center of the cover 27 is formed a through hole in which the upper end of the bottom 9g is arranged. The outer peripheral surface of the bottom 9g is in contact with an edge of the through hole. The upper surface of the cover 27, the upper end surface of the wall portion 9j, and the upper end surface of the bottom 9g are arranged at substantially the same position in the vertical direction.

Three notches 9k cut out downward from the upper end surface of the wall portion 9j are formed in the wall portion 9j. The notch 9k are formed across the entire area in the thickness direction of the wall portion 9j. The lead wire 5 is drawn to the outer peripheral side of the wall portion 9j by using the notches 9k. The lower end of the notches 9k is arranged above the upper surface of the connecting unit 9c (see FIG. 2). On the inner peripheral side of the wall portion 9j, the lead wire 5 is covered by an adhesive. Further, a portion of the notches 9k above the lead wire 5 is filled with an adhesive. A portion of the lead wire 5 arranged in the notches 9k is fixed to the wall portion 9j by an adhesive.

The case body 10 is made of resin. The case body 10 is formed in a bottomed tubular shape having a tube 10c formed in a tubular shape and a bottom 10d configured to close one end of the tube 10c. The axial direction of the tube 10c formed in a tubular shape coincides with the vertical direction. The bottom portion 10d closes the lower end of the tube 10c. The inner peripheral side of the tube 10c and the upper side of the bottom 10d form the pump chamber 11. The case body 10 is provided with a shaft holding unit 10e configured to hold the lower end of the fixed shaft 18, a cylindrical suction port forming unit 10f having a distal end at which the suction port 10a is formed, and a circular discharge port forming unit 10g having a distal end at which a discharge port 10b is formed.

The shaft holding unit 10e is connected to the center part of the bottom 10d via a connecting unit 10h. The shaft holding unit 10e holds the thrust bearing 20 while holding the lower end of the fixed shaft 18. The suction port forming unit 10f protrudes downward from the center of the bottom 10d. The discharge port forming unit 10g protrudes from the outer peripheral surface of the tube 10c toward the outer peripheral side.

(Configuration of Stator, Circuit Board, and Configuration of Periphery of Stator)

Figure 5:
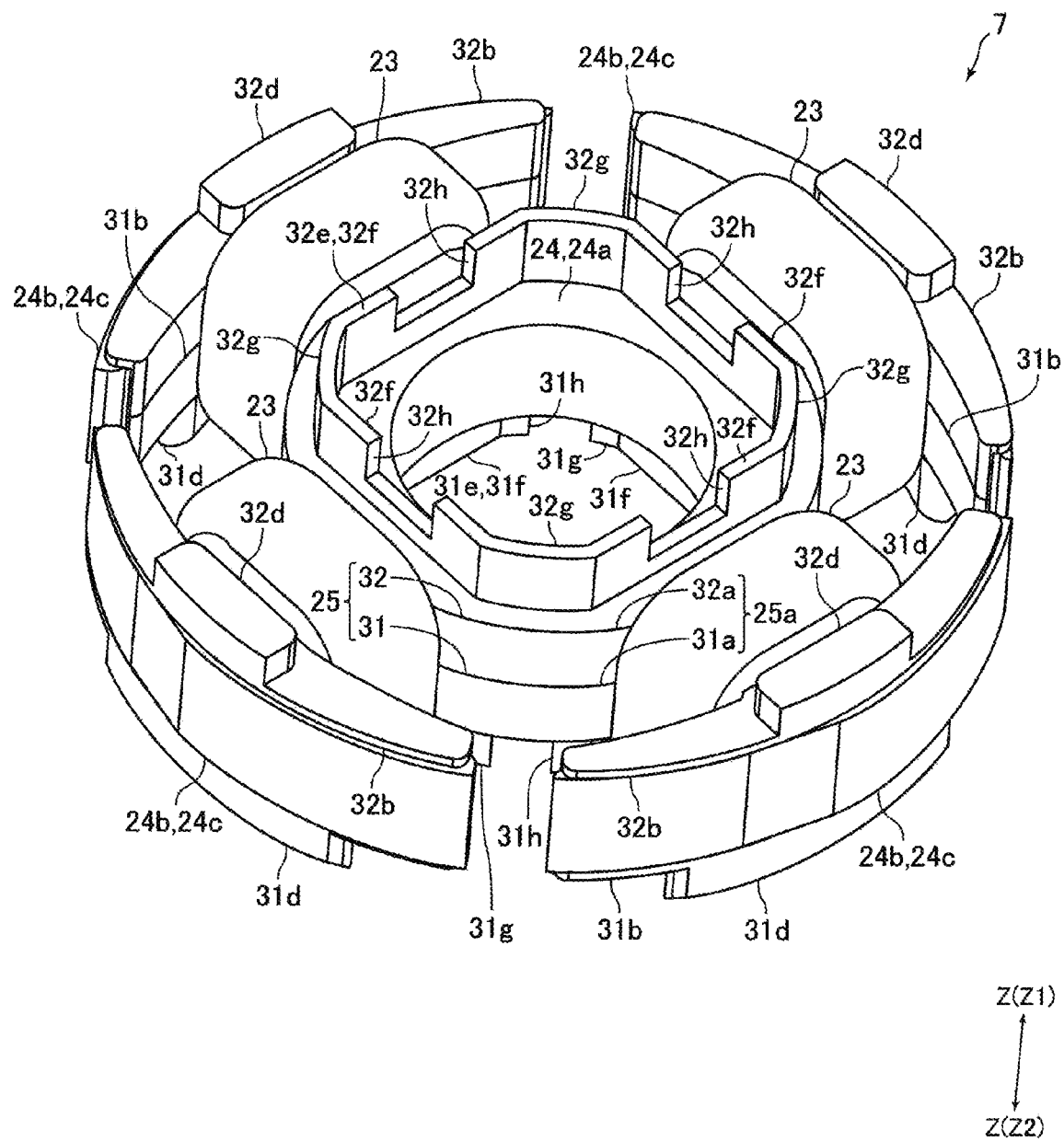
FIG. 5 is a perspective view of a stator illustrated in FIG. 1.
Figure 6:
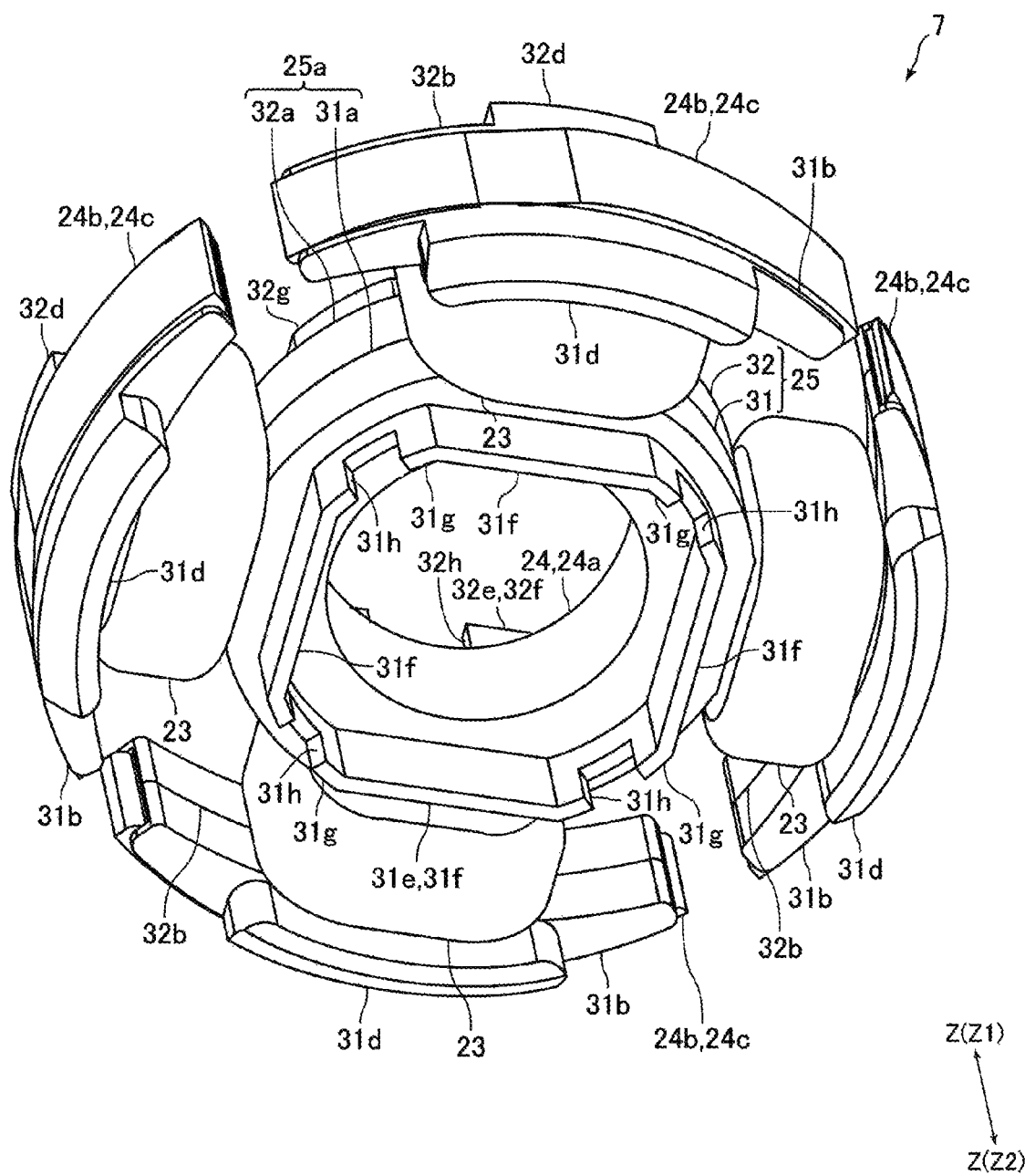
FIG. 6 is a perspective view illustrating the stator illustrated in FIG. 5 from an opposite direction.

FIG. 5 is a perspective view of a stator 7 illustrated in FIG. 1. FIG. 6 is a perspective view illustrating the stator 7 illustrated in FIG. 5 from an opposite direction.

As described above, the stator 7 includes the plurality of driving coils 23, the stator core 24, and the insulator 25. The stator core 24 is a laminated core formed by laminating thin magnetic plates. The stator core 24 includes an annular core portion 24a formed in a ring shape, and a plurality of salient poles 24b protruding from the outer peripheral surface of the annular core portion 24a toward the outer side in the radial direction of the rotor 6. The annular core portion 24a is formed in a flat cylindrical shape. The inner peripheral surface of the annular core portion 24a is in contact with the outer peripheral surface of a portion above the stepped surface 9p of the inner partition wall portion 9e, and the inner partition wall portion 9e is arranged on the inner circumferential side of the stator core 24. The inner end portion of the lower end surface of the annular core portion 24a in the radial direction of the rotor 6 is in contact with the stepped surface 9p.

The stator core 24 according to the present embodiment includes four salient poles 24b. The four salient poles 24b are formed at a pitch of 90° around the fixed shaft 18. The salient poles 24b includes a salient pole distal end 24c that is a distal end of the salient poles 24b (an outer end in the radial direction of the rotor 6), and a connecting unit 24d (see FIG. 3) connecting the salient pole distal end 24c and the annular core portion 24a. The salient pole distal end 24c is formed in a circular arc shape extending from the distal end of the connecting unit 24d (the outer end in the radial direction of the rotor 6) toward both sides in the circumferential direction of the rotor 6.

The driving coil 23 is wound around each of the four salient poles 24b via the insulator 25. Specifically, the driving coil 23 is wound around each of the four connecting units 24d via the insulator 25. The four driving coils 23 are arranged at a pitch of 90° around the fixed shaft 18. The driving coil 23 is electrically connected to the circuit board 4.

The insulator 25 includes a first insulator 31 and a second insulator 32 divided into two parts in the vertical direction. The first insulator 31 constitutes the lower portion of the insulator 25, and the second insulator 32 constitutes the upper portion of the insulator 25.

The first insulator 31 includes an annular first insulator base 31a constituting the inner portion of the first insulator 31 in the radial direction of the rotor 6; four first insulator distal ends 31b constituting the outer portion of the first insulator 31 in the radial direction of the rotor 6; and four first insulator connecting units 31c (see FIG. 3) connecting the first insulator bases 31a and the first insulator distal end 31b.

The second insulator 32 includes an annular second insulator base 32a constituting the inner portion of the second insulator 32 in the radial direction of the rotor 6; four second insulator distal ends 32b constituting the outer portion of the second insulator 32 in the radial direction of the rotor 6; and four second insulator connecting units 32c (see FIG. 3) connecting the second insulator bases 32a and the second insulator distal end 32b.

The first insulator base 31a covers the lower half of the outer peripheral surface of the annular core portion 24a. In addition, the first insulator base 31a covers a part of the lower end surface of the annular core portion 24a. Specifically, the first insulator base 31a covers the outer portion of the lower end surface of the annular core portion 24a in the radial direction of the rotor 6. The first insulator distal end 31b covers the lower half of the inner side surface of the salient pole distal end 24c in the radial direction of the rotor 6, and the lower surface of the salient pole distal end 24c. The first insulator connecting unit 31c covers the lower surface of the connecting unit 24d, and the lower half of both side surfaces of the connecting unit 24d. The first insulator base 31a, the four first insulator distal ends 31b, and the four first insulator connecting units 31c are integrated. That is, the first insulator 31 is integrated in the circumferential direction of the rotor 6.

The second insulator base 32a covers the upper half of the outer peripheral surface of the annular core portion 24a. In addition, the second insulator base 32a covers a part of the upper end surface of the annular core portion 24a. Specifically, the second insulator base 32a covers the outer portion of the upper end surface of the annular core portion 24a in the radial direction of the rotor 6. The second insulator distal end 32b covers the upper half of the inner side surface of the salient pole distal end 24c in the radial direction of the rotor 6, and the upper surface of the salient pole distal end 24c. The second insulator connecting unit 32c covers the upper surface of the connecting unit 24d, and the upper half of both side surfaces of the connecting unit 24d. The second insulator base 32a, the four second insulator distal ends 32b, and the four second insulator connecting units 32c are integrated. That is, the second insulator 32 is integrated in the circumferential direction of the rotor 6.

In the present embodiment, the annular insulator base 25 has a configuration in which the first insulator base 31a and the second insulator base 32a configure an inner portion of the insulator 25 in a radial direction of the rotor 6, while covering an outer peripheral surface of the annular core portion 24a, a part of a lower end surface of the annular core portion 24a, and a part of an upper end surface of the annular core portion 24a. The first insulator base 31a constitutes the lower portion of the insulator base 25a, and the second insulator base 32a constitutes the upper portion of the insulator base 25a.

On the lower surface of the first insulator distal end 31b, there is formed a convex 31d protruding downward. The convex 31d is formed at the center of the lower surface of the first insulator distal end 31b in the circumferential direction of the rotor 6. On the upper surface of the second insulator distal end 32b, there is formed a convex 32d protruding upward. The convex 32d is formed at the center of the upper surface of the second insulator distal end 32b in the circumferential direction of the rotor 6. The convexes 31d and 32d function to prevent a winding of the driving coil 23 from collapsing outward in the radial direction of the rotor 6.

An annular first wall portion 31e rising downward is formed on the lower surface of the first insulator base 31a. In other words, the first insulator 31 includes a first wall portion 31e rising downward from the lower surface of the first insulator base 31a. That is, the insulator 25 includes a first wall portion 31e rising downward from the lower surface of the insulator base 25a. The first wall portion 31e functions to prevent a winding of the driving coil 23 from collapsing inward in the radial direction of the rotor 6.

The first wall portion 31e is formed at the inner end of the lower surface of the first insulator base 31a in the radial direction of the rotor 6. As illustrated in FIG. 6, the first wall portion 31e is formed in a substantially rectangular tubular shape. The first wall portion 31e surrounds the inner partition wall portion 9e. Specifically, the first wall portion 31e surrounds the outer peripheral surface of the portion of the inner partition wall portion 9e below the stepped surface 9p from the outer peripheral side. A gap is formed between the outer peripheral surface of the inner partition wall portion 9e and the inner peripheral surface of the first wall portion 31e. Note that a gap is also formed between the lower end surface of the first wall portion 31e and the upper surface of the annular partition wall portion 9f, and between the lower end surface of the convex 31d and the upper surface of the annular partition wall portion 9f.

The first wall portion 31e formed in a substantially rectangular tubular shape includes four first side surfaces 31f formed in a flat plate shape, and four curved plate shaped second side surfaces 31g arranged in four corners of the first wall portion 31e. The four first side surfaces 31f are arranged at a pitch of 90° around the fixed shaft 18, and the four second side surfaces 31g are arranged at a pitch of 90° around the fixed shaft 18. The first side surfaces 31f are arranged at the same position as the driving coils 23 in the circumferential direction of the rotor 6, and the second side surfaces 31g are arranged between the driving coils 23 in the circumferential direction of the rotor 6.

In the second side surfaces 31g, there is formed a first notch 31h cut out upward from the lower end surface of the second side surfaces 31g. That is, in the first wall portion 31e, there are formed four first notches 31h cut out upward from the lower end surface of the first wall portion 31e. The first notch 31h is formed at the center of the second side surface 31g in the circumferential direction of the rotor 6. The first notch 31h is formed between the driving coils 23 in the circumferential direction of the rotor 6. The four first notches 31h are arranged at a pitch of 90° around the fixed shaft 18. The first notch 31h is formed in a rectangular shape. The upper end of the first notch 31h is arranged below the lower surface of the first insulator base 31a, and the first notch 31h is formed across the entire area of the first wall portion 31e in the vertical direction.

As described above, in the upper surface of the annular partition wall portion 9f, the four reinforcing ribs 9r are formed at a pitch of 90° around the fixed shaft 18. The reinforcing ribs 9r are formed between the driving coils 23 in the circumferential direction of the rotor 6. A part of the reinforcing ribs 9r is arranged in the first notch 31h. Specifically, a part of the first rib 9s is arranged in the first notch 31h. The first wall portion 31e strides over the first rib 9s in the first notch 31h.

An annular second wall portion 32e rising upward is formed on the upper surface of the second insulator base 32a. In other words, the second insulator 32 includes a second wall portion 32e rising upward from the upper surface of the second insulator base 32a. That is, the insulator 25 includes a second wall portion 32e rising upward from the upper surface of the insulator base 25a. The second wall portion 32e functions to prevent a winding of the driving coil 23 from collapsing inward in the radial direction of the rotor 6.

The second wall portion 32e is formed at the inner end of the upper surface of the second insulator base 32a in the radial direction of the rotor 6. As illustrated in FIG. 5, the second wall portion 32e is formed in a substantially rectangular tubular shape. The second wall portion 32e surrounds the inner partition wall portion 9e. Specifically, the second wall portion 32e surrounds the outer peripheral surface of the portion in the upper end side of the inner partition wall portion 9e above the stepped surface 9p from the outer peripheral side. A gap is formed between the outer peripheral surface of the inner partition wall portion 9e and the inner peripheral surface of the second wall portion 32e.

The second wall portion 32e formed in a substantially rectangular tubular shape includes four first side surfaces 32f formed in a flat plate shape, and four curved plate shaped second side surfaces 32g arranged in four corners of the second wall portion 32e. The four first side surfaces 32f are arranged at a pitch of 90° around the fixed shaft 18, and the four second side surfaces 32g are arranged at a pitch of 90° around the fixed shaft 18. The first side surfaces 32f are arranged at the same position as the driving coils 23 in the circumferential direction of the rotor 6, and the second side surfaces 32g are arranged between the driving coils 23 in the circumferential direction of the rotor 6.

In the first side surfaces 32f, there is formed a second notch 32h cut out downward from the upper end surface of the first side surfaces 32f. That is, in the second wall portion 32e, there are formed four second notches 32h cut out downward from the upper end surface of the second wall portion 32e. The second notch 32h is formed at the center of the first side surface 32f in the circumferential direction of the rotor 6. The second notch 32h is formed at a position where the driving coil 23 is arranged in a circumferential direction of the rotor 6. The four second notches 32h are arranged at a pitch of 90° around the fixed shaft 18. The second notch 32h is formed in a rectangular shape. The lower end of the second notch 32h is arranged above the upper surface of the second insulator base 32a, and the second notch 32h is formed across the entire area of the second wall portion 32e in the vertical direction.

As described above, the circuit board 4 is arranged on the upper end side of the stator 7. The circuit board 4 is placed on the upper surface of the connecting unit 9c of the motor case 9. A through hole through which protrusions 9h are inserted is formed in the circuit board 4. The circuit board 4 is positioned in the radial direction of the rotor 6 by the protrusions 9h to be inserted through the through hole. Further, the circuit board 4 is fixed to the motor case 9 by welding the upper ends of the protrusions 9h. That is, the circuit board 4 is fixed to the motor case 9 by melting the upper ends of the projections 9h.

On the circuit board 4, there are formed notches 4b in which a part of the upper end side of two driving coils 23 adjacent to each other in the circumferential direction of the rotor 6 among the four driving coils 23 is arranged (See FIG. 1). Further, in the circuit board 4, there are formed notches 4c for preventing interference between the remaining two driving coils 23 and the circuit board 4. That is, two notches 4b and two notches 4c are formed in the circuit board 4. The upper end of the driving coil 23 is arranged above the lower surface of the circuit board 4. The notch 4b according to the present embodiment is the third notch.

In the circumferential direction of the rotor 6, an opposing surface 4d opposed to the outer side surface of the second side surface 32g in the radial direction of the rotor 6 is formed between the two notches 4b, between one notch 4b of the two notches 4b and one notch 4c of the two notches 4c, and between the other notch 4b and the other notch 4c. That is, on the circuit board 4, there are formed three opposing surfaces 4d opposed to the outer peripheral surface of the second wall portion 32e, and arranged between the driving coils 23 in the circumferential direction of the rotor 6. A slight gap is formed between the outer peripheral surface of the second wall portion 32e and the opposing surface 4d.

A potting resin P is filled in a region defined by the motor case 9 and the cover 27 (that is, a region defined by the partition wall 9a, the outer peripheral tube 9b, the connecting unit 9c, and the cover 27). That is, a potting resin P is filled in the region that is inside of the pump case 8 and outside of the pump chamber 11, and in which the stator 7 is arranged, and the potting resin P is filled in the region above the annular partition wall portion 9f and between the inner partition wall portion 9e and the outer partition wall portion 9d. The circuit board 4 and the stator 7 are covered with the potting resin P. The potting resin P is poured from the upper side of the motor case 9.

In the present embodiment, after the lead wires 5 are soldered to the circuit board 4, the circuit board 4 is placed on the upper surface of the connecting unit 9c of the motor case 9 with the stator 7 being attached thereto. At this time, for example, the potting resin P is filled up to the vicinity of the upper surface of the connecting unit 9c. Thereafter, a part of the lead wires 5 is arranged in the notch 9k, and after applying and curing an adhesive in a portion of the lead wires 5 arranged on the inner peripheral side of the wall portion 9j and a portion of the notch 9k on the upper side of the lead wires 5, the remaining potting resin P is filled to cover the circuit board 4 and the stator 7. Thereafter, the cover 27 is attached to the wall portion 9j of the motor case 9 to close the opening formed at the upper end of the wall portion 9j with the cover 27.

(Main Effect of Present Embodiment)

As described above, in the present embodiment, four first notches 31h are formed in the annular first wall portion 31e surrounding the inner partition wall portion 9e. Therefore, in the present embodiment, even if the first insulator 31 is integrated in the circumferential direction of the rotor 6 and the first wall portion 31e is formed in a ring shape, it is possible to pour the potting resin P up to the inner peripheral side of the first wall portion 31 by using the first notch 31h. Accordingly, in the present embodiment, even if the first insulator 31 is integrated in the circumferential direction of the rotor 6, it is possible to easily fill the potting resin P up to the inner peripheral side of the first wall portion 31e configured to prevent a winding of the driving coil 23 from collapsing in the inner side in the radial direction of the rotor 6.

Further, in the present embodiment, since four second notches 32h are formed in the annular second wall portion 32e surrounding the inner partition wall portion 9e, even if the second insulator 32 is integrated in the circumferential direction of the rotor 6 and the second wall portion 31e is formed in a ring shape, it is possible to pour the potting resin P up to the inner peripheral side of the second wall portion 32e by using the second notch 32h. Accordingly, in the present embodiment, even if the second insulator 32 is integrated in the circumferential direction of the rotor 6, it is possible to easily fill the potting resin P up to the inner peripheral side of the second wall portion 32e configured to prevent a winding of the driving coil 23 from collapsing in the inner side in the radial direction of the rotor 6.

It is noted that if only four first side surfaces 31f are formed on the lower surface of the first insulator base 31a and the annular first wall portion 31e is not formed, the strength of the first side surface 31f can no longer be secured, and it may not prevent a winding of the driving coil 23 from collapsing in the inner side in the radial direction of the rotor 6. Similarly, if only four first side surfaces 32f are formed on the upper surface of the second insulator base 32a and the annular second wall portion 32e is not formed, the strength of the first side surface 32f can no longer be secured, and it may not prevent a winding of the driving coil 23 from collapsing in the inner side in the radial direction of the rotor 6. On the other hand, in the present embodiment, since the first wall portion 31e and the second wall portion 32e are formed in a ring shape, and it is possible to secure the strength of the first wall portion 31e and the strength of the second wall portion 32e, it is possible to prevent a winding of the driving coil 23 from collapsing in the inner side in the radial direction of the rotor 6.

In the present embodiment, the first notch 31h is formed between the driving coils 23 in the circumferential direction of the rotor 6. Therefore, in the present embodiment, the flow of the potting resin P that is poured up to the inner peripheral side of the first wall portion 31e through the first notch 31h does not tend to be hindered by the driving coil 23. Therefore, in the present embodiment, the potting resin P can be easily poured in the inner peripheral side of the first wall portion 31e.

Further, in the present embodiment, since a part of the reinforcing ribs 9r is arranged in the first notch 31h, when the potting resin P is filled in the region defined by the motor case 9 and the cover 27, the potting resin P that is contact with a side of the reinforcing ribs 9r can be made to flow along the side of the reinforcing ribs 9r and pass through the first notch 31h. That is, in the present embodiment, it is possible to pour the potting resin P to the inner peripheral side of the first wall portion 31e by using the side of the reinforcing ribs 9r. Therefore, in the present embodiment, the potting resin P can be more easily poured in the inner peripheral side of the first wall portion 31e. Further, in the present embodiment, since the reinforcing ribs 9r are formed between the driving coils 23 in the circumferential direction of the rotor 6, it is possible to prevent a contact between driving coils 23 adjacent to each other in the circumferential direction of the rotor 6.

In the present embodiment, notches 4b are formed in the circuit board 4 arranged above the stator 7. Therefore, in the present embodiment, even if the circuit board 4 is arranged above the stator 7, the potting resin P can be easily poured in the region in which the stator 7 is arranged, by using the notches 4b.

It is noted that in the present embodiment, since the notches 4b and 4c are formed in the circuit board 4, and the upper end of the driving coils 23 is arranged above the lower surface of the circuit board 4, the pump device 1 can be reduced in thickness in the vertical direction. Further, in the present embodiment, since the upper portion of the lead wire 5 in the notch 9k is filled with the adhesive, when the potting resin P is poured so as to cover the circuit board 4 and the stator 7, it is possible to prevent the potting resin P from flowing out to the outer peripheral side of the wall portion 9j from the notch 9k.

Other Embodiments

The above-described embodiment is an example of a preferred embodiment of the present disclosure, but the present disclosure is not limited thereto, and various modifications can be made without changing the gist of the present disclosure.

In the above embodiment, the opposing surface 4d of the circuit board 4 may be in contact with the outer side surface of the second side surface 32g in the radial direction of the rotor 6. That is, three opposing surfaces 4d may be in contact with the outer circumferential surface of the second wall portion 32e. In this case, the circuit board 4 is positioned in the radial direction of the rotor 6 by the outer peripheral surface of the second wall portion 32e and the three opposing surfaces 4d. In this case, even if the potting resin P can be poured in the inner peripheral side of the second wall portion 32e by using the second notch 32h, it is possible to use the second wall portion 32e to position the circuit board 4 in the radial direction of the rotor 6.

In the above-described embodiment, the number of the first notches 31h formed in the first wall portion 31e may be three or less, or may be five or more. Similarly, in the above-described embodiment, the number of the second notches 32h formed in the second wall portion 32e may be three or less, or may be five or more. Further, in the above-described embodiment, the number of the salient poles 24b included in the stator core 24 may be two or three, or may be five or more. In addition, in the above-described embodiment, the notches 31h may be formed in the first side surface 31f. That is, the first notches 31h may be formed at a position where the driving coils 23 are arranged in a circumferential direction of the rotor 6.

Figure 7:
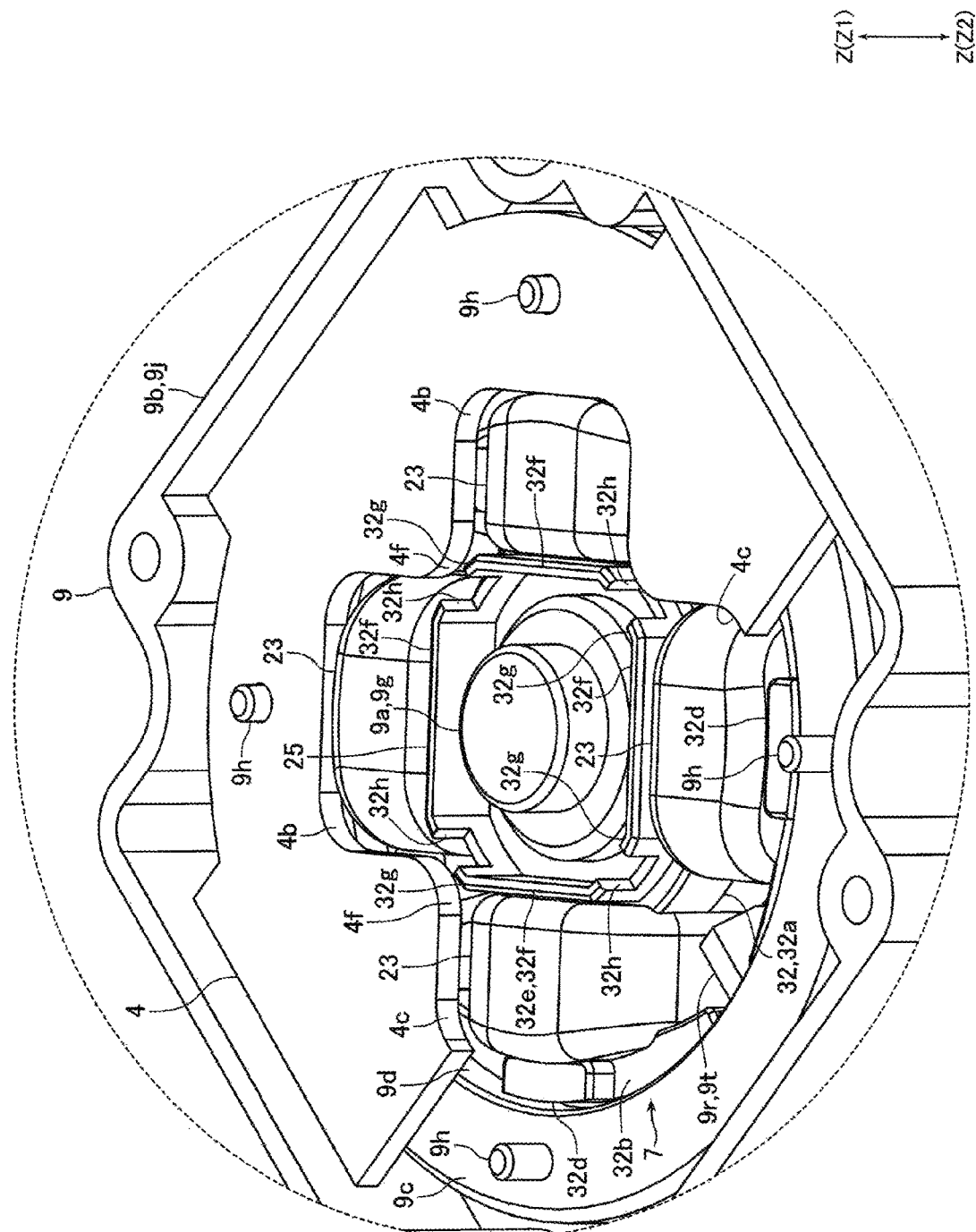
FIG. 7 is a perspective view for describing a configuration of a second wall portion and a circuit board according to another embodiment of the present disclosure.
Figure 8:
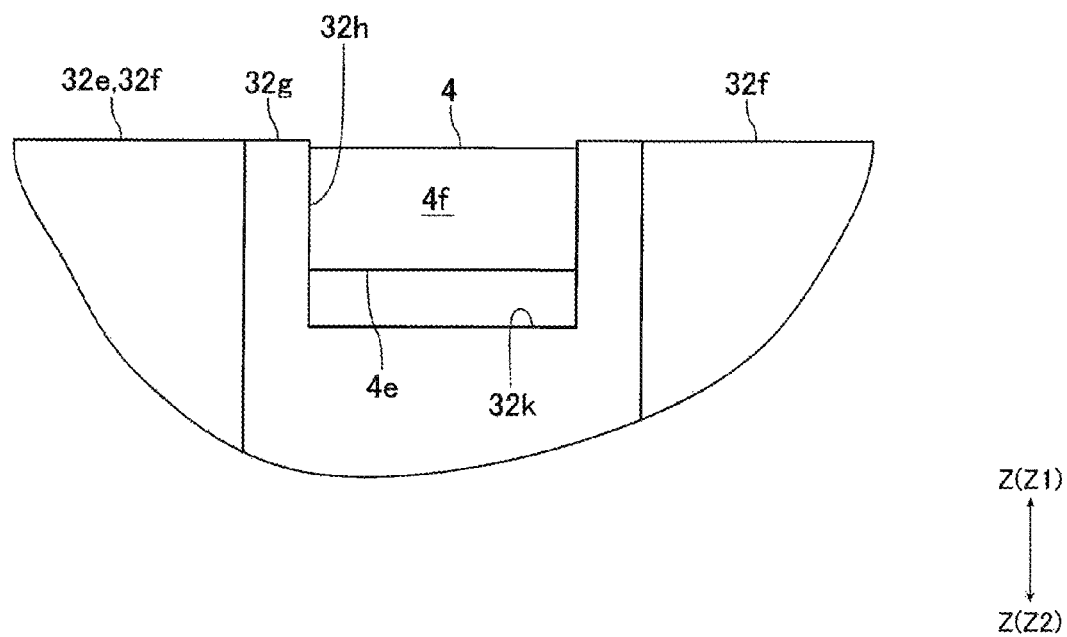
FIG. 8 is a view for describing an arrangement relationship between an end surface on a first direction side of a second notch and a surface on a first direction side of the circuit board illustrated in FIG. 7.

In the above-described embodiment, as illustrated in FIG. 7, the second notch 32h may be formed in the second side surface 32g. That is, the second notch 32h may be formed between the driving coils 23 in the circumferential direction of the rotor 6. In this case, for example, as illustrated in FIG. 8, the lower end surface 32k of the second notch 32h formed in a rectangular shape is arranged below the lower surface 4e of the circuit board 4. Further, a curved surface 4f in the shape of a convex curved surface is formed in the circuit board 4 instead of the opposing surface 4d, and a comparatively wide gap is formed between the outer circumferential surface of the second side surface 32g and the curved surface 4f.

In the modification illustrated in FIG. 7 and FIG. 8, the second notch 32h is formed in the second side surface 32g while the lower end surface 32k of the second notch 32h is arranged below the lower surface 4e of the circuit board 4. Therefore, in the modification, the flow of the potting resin P pouring to the inner peripheral side of the second wall portion 32e through the second notch 32g does not tend to be hindered by the driving coil 23 and the circuit board 4. Therefore, the potting resin can be easily poured in the inner peripheral side of the second wall portion 32e.

It is noted that in the modification illustrated in FIG. 7 and FIG. 8, the lower end surface 32k of the second notch 32h may be arranged above the lower surface 4e of the circuit board 4, or may be arranged at the same position as the lower surface 4e of the circuit board 4 in the vertical direction. Further, in FIG. 7 and FIG. 8, the same symbol is assigned to the configuration similar to that in the above-described embodiment. In addition, in FIG. 7, the illustration of the lead wire 5, the notch 9k, etc. is omitted.

In the above-described embodiment, the first insulator base 31a may cover the entire lower end surface of the annular core portion 24a. Further, in the above-described embodiment, the second insulator base 32a may cover the entire upper end surface of the annular core portion 24a. Further, in the above-described embodiment, the insulator 25 may be integrally formed with the stator core 24.

In the above-described embodiment, the motor 2 may be an inner rotor type motor. In this case, the stator core 24 includes an annular core portion formed in a ring shape, and a plurality of salient poles protruding inward in a radial direction of the rotor 6 from the inner circumferential surface of the annular core portion. Further, in this case, the insulator 25 includes an insulator base constituting the inner portion of the insulator 25 in the radial direction of the rotor 6, and also covering both the upper and lower surfaces of the salient pole distal end that is the distal end of the salient pole, and the outer side surface of the salient pole distal end in the radial direction of the rotor 6, and in the insulator base, there is formed an annular first wall portion corresponding to the first wall portion 31e, and an annular second wall portion corresponding to the second wall portion 32e.

In the above-described embodiment, the reinforcing ribs 9r may not be formed in the partition wall 9a. Further, in the above-described embodiment, the motor 2 may, instead of the fixed shaft 18, include a rotating shaft to which the impeller 3 is fixed. In this case, the rotating shaft is the rotation center axis that is the rotation center of the impeller 3 and the rotor 6.

What is claimed is:

1. A pump device, comprising:
   a motor, having a rotor and a stator; and
   an impeller, fixed to the rotor and configured to be rotated by a power of the motor,
   wherein
   a pump chamber through which a liquid sucked from a suction port passes toward a discharge port is provided inside a pump case, and the rotor, the stator, and the impeller are housed in the pump case,
   the rotor and the impeller are arranged inside the pump chamber,
   the stator is arranged outside the pump chamber,
   the motor comprises a partition wall defining a part of the pump chamber, and the partition wall is arranged between the rotor and the impeller, and the stator, so as to partition the rotor and the impeller from the stator,
   a potting resin is filled in a region that is inside of the pump case and outside of the pump chamber, and in which the stator is arranged,
   one of axial directions of a rotation center axis serving as a rotation center of the rotor and the impeller is set as a first direction, and an opposite direction of the first direction is set as a second direction,
   the stator comprises: a driving coil; an insulator formed of an insulating material; and a stator core having a plurality of salient poles around which the driving coil is wound via the insulator,
   the partition wall comprises: an inner partition wall portion with a tubular shape arranged on an inner peripheral side of the stator core,
   the insulator comprises: a first wall portion with an annular shape, rising toward a side of the first direction and surrounding the inner partition wall portion, the first wall portion being configured to prevent a winding of the driving coil from collapsing inward in a radial direction of the rotor; and a second wall portion with the annular shape, rising toward a side of the second direction and surrounding the inner partition wall portion, the second wall portion being configured to prevent the winding of the driving coil from collapsing inward in the radial direction of the rotor,
   in the first wall portion, there is provided a first end surface on the side of the first direction of the first wall portion which faces toward the side of the first direction and from which a first notch is recessed toward the second direction, and
   in the second wall portion, there is provided a second end surface on the side of the second direction of the second wall portion which faces toward the side of the second direction and from which a second notch is recessed toward the first direction wherein the first notch is provided between adjacent salient poles in a circumferential direction of the rotor.

2. The pump device according to claim 1, wherein
   the stator core comprises:
     an annular core portion, provided in a ring shape; and
     the plurality of salient poles, protruding from the annular core portion toward an outer side in the radial direction of the rotor;
   the insulator comprises:
     an insulator base with the annular shape, constituting an inner portion of the insulator in the radial direction of the rotor, the insulator base being configured to cover at least a part of an outer peripheral surface of the annular core portion, at least a part of an end surface on the side of the first direction of the annular core portion, and at least a part of an end surface on the side of the second direction of the annular core portion;
     the first wall portion, rising toward the side of the first direction from a surface on the side of the first direction of the insulator base; and
     the second wall portion, rising toward the side of the second direction from a surface on the side of the second direction of the insulator base.

3. The pump device according to claim 2, wherein
   the insulator includes: a first insulator and a second insulator divided in an axial direction of the rotation center axis,
   the first insulator comprises: a first insulator base, constituting a first direction side portion of the insulator base; and the first wall portion, rising toward the side of the first direction from a surface on the side of the first direction of the first insulator base, and
   the second insulator comprises: a second insulator base, constituting a second direction side portion of the insulator base; and the second wall portion, rising toward the side of the second direction from a surface on the side of the second direction of the second insulator base.

4. The pump device according to claim 1, wherein
   the rotor comprises: a driving magnet, arranged on an outer peripheral side of the stator,
   the partition wall comprises:
     the inner partition wall portion;
     an outer partition wall portion with the tubular shape, arranged on an outer peripheral side of the stator and an inner peripheral side of the driving magnet; and
     an annular partition wall portion with a ring shape, extending from a first direction end of the inner partition wall portion toward an outer side in the radial direction of the rotor, the annular partition wall portion being configured to connect the first direction end of the inner partition wall portion and the first direction end of the outer partition wall portion, the stator is arranged on the side of the second direction of the annular partition wall portion and between the inner partition wall portion and the outer partition wall portion, and the potting resin is filled on at least the side of the second direction of the annular partition wall portion and between the inner partition wall portion and the outer partition wall portion.

5. The pump device according to claim 1, wherein the partition wall comprises: an annular partition wall portion with a ring shape, extending from a first direction end of the inner partition wall portion toward an outer side in the radial direction of the rotor, on a surface on the side of the second direction of the annular partition wall portion, there are provided a plurality of reinforcing ribs with a flat plate shape, configured to be connected to an outer peripheral surface of the inner partition wall portion and also to be connected to a surface on the side of the second direction of the annular partition wall portion, the reinforcing ribs are provided between the driving coils in the circumferential direction of the rotor, and a part of the reinforcing ribs is arranged in the first notch.

6. The pump device according to claim 1, further comprising:

a circuit board, configured to control the motor, wherein the impeller is fixed on the side of the first direction of the rotor, the circuit board is a rigid board in a flat plate shape, is arranged on the side of the second direction of the stator, and is covered with the potting resin, a thickness direction of the circuit board coincides with an axial direction of the rotation center axis, and a third notch in which a part on a second direction end side of the driving coil is arranged is provided in the circuit board.

7. The pump device according to claim 6, wherein the second notch is provided at a position where the driving coil is arranged in a circumferential direction of the rotor, and in the circuit board, there are provided a plurality of opposing surfaces arranged between the driving coils in the circumferential direction of the rotor and opposing to an outer peripheral surface of the second wall portion.

8. The pump device according to claim 7, wherein the second notch is provided between the driving coils in the circumferential direction of the rotor, and an end surface on the side of the first direction of the second notch is arranged on the side of the first direction from a surface on the side of the first direction of the circuit board.

9. The pump device according to claim 8, wherein the stator core comprises:

an annular core portion, provided in a ring shape; and the plurality of salient poles, protruding from the annular core portion toward an outer side in the radial direction of the rotor;

the insulator comprises:

an insulator base with the annular shape, constituting an inner portion of the insulator in the radial direction of the rotor, the insulator base being configured to cover at least a part of an outer peripheral surface of the annular core portion, at least a part of an end surface on the side of the first direction of the annular core portion, and at least a part of an end surface on the side of the second direction of the annular core portion;

the first wall portion, rising toward the side of the first direction from a surface on the side of the first direction of the insulator base; and the second wall portion, rising toward the side of the second direction from a surface on the side of the second direction of the insulator base.

10. The pump device according to claim 9, wherein the insulator includes: a first insulator and a second insulator divided in an axial direction of the rotation center axis, the first insulator comprises: a first insulator base, constituting a first direction side portion of the insulator base; and the first wall portion, rising toward the side of the first direction from a surface on the side of the first direction of the first insulator base, and the second insulator comprises: a second insulator base, constituting a second direction side portion of the insulator base; and the second wall portion, rising toward the side of the second direction from a surface on the side of the second direction of the second insulator base.

11. The pump device according to claim 10, wherein the rotor comprises: a driving magnet, arranged on an outer peripheral side of the stator, the partition wall comprises:

the inner partition wall portion;

an outer partition wall portion with the tubular shape, arranged on an outer peripheral side of the stator and an inner peripheral side of the driving magnet; and an annular partition wall portion with a ring shape, extending from a first direction end of the inner partition wall portion toward an outer side in the radial direction of the rotor, the annular partition wall portion being configured to connect the first direction end of the inner partition wall portion and the first direction end of the outer partition wall portion, the stator is arranged on the side of the second direction of the annular partition wall portion and between the inner partition wall portion and the outer partition wall portion, and the potting resin is filled on at least the side of the second direction of the annular partition wall portion and between the inner partition wall portion and the outer partition wall portion.

12. The pump device according to claim 11, wherein the first notch is provided between the driving coils in a circumferential direction of the rotor.

13. The pump device according to claim 12, wherein the partition wall comprises: an annular partition wall portion with a ring shape, extending from a first direction end of the inner partition wall portion toward an outer side in the radial direction of the rotor, on a surface on the side of the second direction of the annular partition wall portion, there are provided a plurality of reinforcing ribs with a flat plate shape, configured to be connected to an outer peripheral surface of the inner partition wall portion and also to be connected to a surface on the side of the second direction of the annular partition wall portion, the reinforcing ribs are provided between the driving coils in the circumferential direction of the rotor, and
a part of the reinforcing ribs is arranged in the first notch.

* * * * *